S. FREET.
Horse Rake.
No. 69,332.
Patented Oct. 1, 1867.
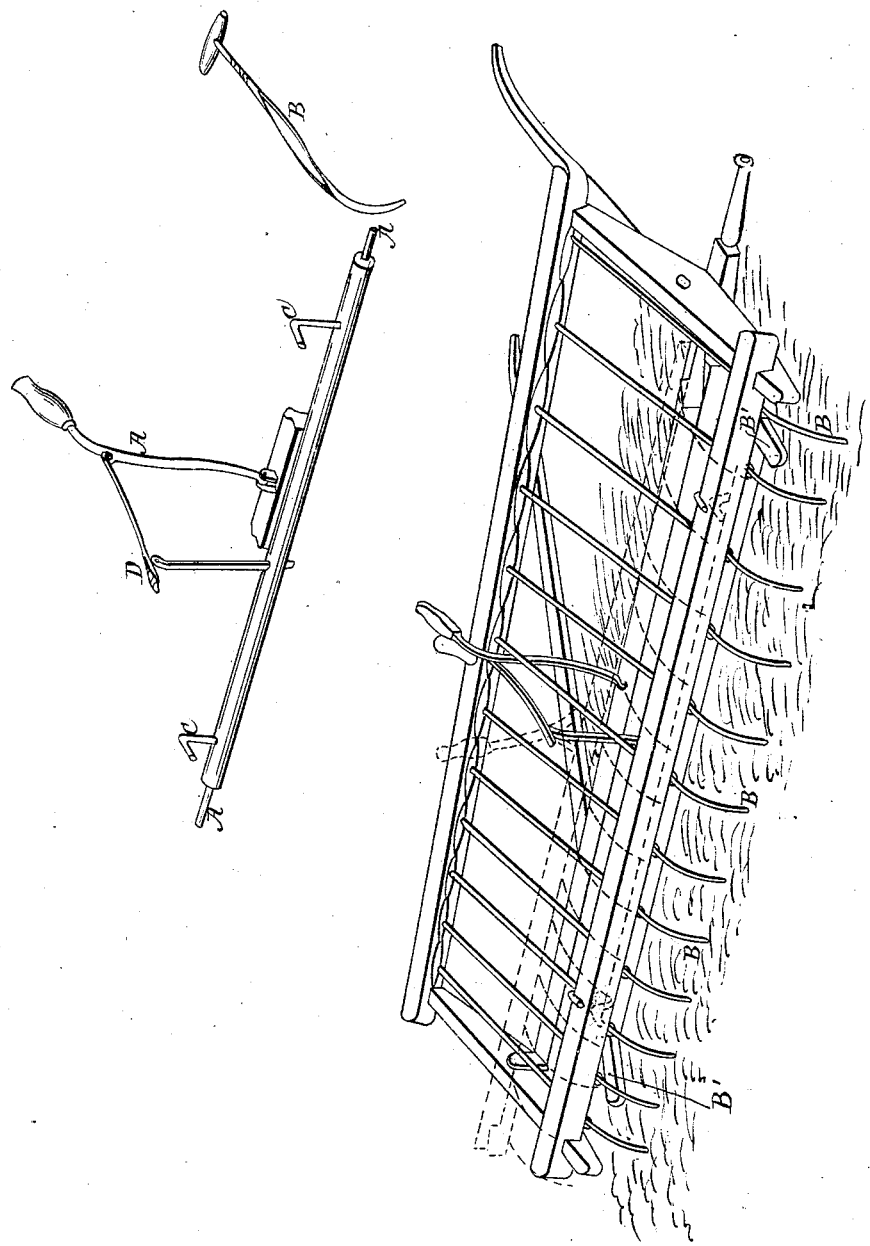
Witnesses.
W. W. Britton
C. K. Freet
Inventor
Samuel Freet

United States Patent Office.

SAMUEL FREET, OF UPPER STRASBURG, PENNSYLVANIA.

Letters Patent No. 69,332, dated October 1, 1867.

IMPROVEMENT IN HORSE-RAKES.

The Schedule referred to in these Letters Patent and making part of the same.

TO ALL WHOM IT MAY CONCERN:

Be it known that I, SAMUEL FREET, of the town of Upper Strasburg, in the county of Franklin, and State of Pennsylvania, have invented a new and useful Improvement in Wire-Tooth Rakes; and I do hereby declare that the following is a full, clear, and exact description of the construction and operation of the same, reference being had to the accompanying drawings, as will more fully appear.

The double-acting lever A is attached to the roller B, and the roller B attached to the ends of the shafts $B^1$ which extend out behind the axle. The hooks C C lift from off the cross-piece which is across the teeth before the teeth are raised to empty the rake, and when the rake is empty, just let the lever A drop, and the teeth will drop to their place before the hooks C C fasten over the cross-piece to hold the rake down and make the teeth $B^2$ spring when raking hay or heaping the same.

The rake is very easily operated. The driver on the rake, when the rake is full, has only to pull the lever A and the rake is empty, then let it go, and the teeth will drop and the hooks C C will go to their place and keep the teeth down. And to move the rake from place to place, just pull the lever A forward, and place one foot on the step to hold it until you throw the lever back, and the cross-piece will then rest on the lever-piece D without holding it there with hand or foot.

What I claim as my invention, and desire to secure by Letters Patent, is—

The combination of the double-acting lever A and the roller B with hooks C C, the lever being attached to the roller B, which is attached or fixed on the ends of the shafts $B^1$, having in it two hooks C C, to hold down the teeth when raking heavy hay or heaping the same.

SAMUEL FREET.

Witnesses:
W. W. BRITTON,
C. R. FREET.